(12) United States Patent
Chen

(10) Patent No.: US 11,595,291 B2
(45) Date of Patent: Feb. 28, 2023

(54) GRAPH-BASED NODE CLASSIFICATION BASED ON CONNECTIVITY AND TOPOLOGY

(71) Applicant: PayPal, Inc., San Jose, CA (US)

(72) Inventor: Zhe Chen, Singapore (SG)

(73) Assignee: PayPal, Inc., San Jose, CA (US)

( * ) Notice: Subject to any disclaimer, the term of this patent is extended or adjusted under 35 U.S.C. 154(b) by 101 days.

(21) Appl. No.: 17/162,018

(22) Filed: Jan. 29, 2021

(65) Prior Publication Data

US 2022/0247662 A1 Aug. 4, 2022

(51) Int. Cl.
| | | |
|---|---|---|
| H04L 45/02 | (2022.01) | |
| H04L 45/00 | (2022.01) | |
| H04L 45/16 | (2022.01) | |
| G06N 3/04 | (2023.01) | |

(52) U.S. Cl.
CPC .......... H04L 45/02 (2013.01); G06N 3/0454 (2013.01); H04L 45/14 (2013.01); H04L 45/16 (2013.01); H04L 45/22 (2013.01)

(58) Field of Classification Search
CPC ........ H04L 45/02; H04L 45/14; H04L 45/16; H04L 45/22; G06N 3/0454
See application file for complete search history.

(56) References Cited

U.S. PATENT DOCUMENTS

| | | | | |
|---|---|---|---|---|
| 10,887,182 | B1 * | 1/2021 | Xie | ..................... H04L 41/0813 |
| 2015/0195126 | A1 * | 7/2015 | Vasseur | .................. G06N 99/00 |
| | | | | 370/218 |
| 2018/0131616 | A1 * | 5/2018 | LaBerge | ................. H04L 47/13 |
| 2019/0334644 | A1 * | 10/2019 | Thubert | .................. H04B 1/713 |
| 2022/0004865 | A1 * | 1/2022 | Sawal | ..................... G06F 30/18 |
| 2022/0019745 | A1 * | 1/2022 | Jin | ........................ G06N 3/0454 |
| 2022/0078071 | A1 * | 3/2022 | Agapitos | ................. H04L 41/16 |

OTHER PUBLICATIONS

Ribeiro et al., "struc2vec: Learning Node Representations from Structural Identity," KDD 2017 Research Paper, Aug. 13-17, 2017, pp. 385-394.

(Continued)

*Primary Examiner* — Min Jung

(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed for determining predictions from a graph of a network dataset. The graph of the network dataset may include nodes describing entities and edges describing connections or links between the entities. Predictions may be made using a dual-path convolution network that considers both node connectivity and node topology. Node topology includes assessment of similarities in topology roles between nodes in the graph, even nodes that reside in different parts of the graph. The node connectivity and node topology in the dual-path convolution may be aligned using a multi-head attention network. Outputs from previous layers of the multi-head attention network may be provided as inputs to subsequent layers of the dual-path convolution to mutually reinforce the convolutions determining node connectivity and node topology toward alignment.

20 Claims, 11 Drawing Sheets

(56) References Cited

OTHER PUBLICATIONS

Ahmed et al., "Learning Role-based Graph Embeddings," arXiv:1802.02896v2 [stat.ML] Jul. 2, 2018; 8 pages.
Cheng et al., "From n-gram to skipgram to concgram," International Journal of Corpus Linguistics 11:4 (2006), pp. 411-433.
Donnat et al., "Learning Structural Node Embeddings via Diffusion Wavelets," KDD '18, Aug. 19-23, 2018; https://doi.org/10.1145/3219819.3220025; 10 pages.
Gao et al., "Large-Scale Learnable Graph Convolutional Networks," arXiv:1808.03965v1 [cs.LG] Aug. 12, 2018; 9 pages.
Grover et al., "node2vec: Scalable Feature Learning for Networks," KDD '16, Aug. 13-17, 2016; https://dl.acm.org/doi/10.1145/2939672.2939754, pp. 855-864.
Hamilton et al., "Inductive Representation Learning on Large Graphs," 31st Conference on Neural Information Processing Systems (NIPS 2017), 11 pages.
Henderson et al., "RolX: Structural Role Extraction & Mining in Large Graphs," KDD'12, Aug. 12-16, 2012, pp. 1231-1239.
Huang et al., "Aligned Dual Channel Graph Convolutional Network for Visual Question Answering," Proceedings of the 58th Annual Meeting of the Association for Computational Linguistics, pp. 7166-7176.
Kipf et al., "Semi-Supervised Classification With Graph Convolutional Networks," Published as a conference paper at ICLR 2017, arXiv:1609.02907v4 [cs.LG] Feb. 22, 2017; 14 pages.
Liu et al., "Heterogeneous Graph Neural Networks for Malicious Account Detection," CIKM '18, Oct. 22-26, 2018; arXiv:2002.12307v1 [cs.LG] Feb. 27, 2020; 9 pages.
Mikolov et al., "Efficient Estimation of Word Representations in VectorSpace," arXiv:1301.3781v3 [cs.CL] Sep. 7, 2013; 12 pages.
Mikolov et al., "Distributed Representations of Words and Phrases and their Compositionality," arXiv:1310.4546v1 [cs.CL] Oct. 16, 2013; 9 pages.
Perozzi et al., "DeepWalk: Online Learning of Social Representations," The authors, 2014; scearXiv:1403.6652v2 [cs.SI] Jun. 27, 2014; 10 pages.
Ribeiro et al., "struc2vec: Learning Node Representations from Structural Identity," KDD '17, Aug. 13-17, 2017; arXiv:1704.03165v3 [cs.SI] Jul. 3, 2017; 10 pages.
Rossi et al., "HONE: Higher-Order Network Embeddings," arXiv:1801.09303v2 [stat.ML] May 30, 2018; 10 pages.
Rossi et al., "Deep Inductive Graph Representation Learning," IEEE Transactions on Knowledge and Data Engineering, vol. 32, No. 3, Mar. 2020, p. 438.
Schlichtkrull et al., "Modeling Relational Data with Graph Convolutional Networks," arXiv:1703.06103v4 [stat.ML] Oct. 26, 2017; 9 pages.
Tang et al., "LINE: Large-scale Information Network Embedding," WWW 2015, May 18-22, 2015; arXiv:1503.03578v1 [cs.LG] Mar. 12, 2015; 11 pages.
Velickovic et al., "Graph Attention Networks," Published as a conference paper at ICLR 2018; arXiv:1710.10903v3 [stat.ML] Feb. 4, 2018; 12 pages.
Zheng et al., "Dual-Path Convolutional Image-Text Embeddings with Instance Loss," Journal of Latex Class Files, vol. 14, No. 8, Aug. 2015; arXiv:1711.05535v3 [cs.CV] Jul. 17, 2018; 15 pages.
Zhuang et al., "Dual Graph Convolutional Networks for Graph-Based Semi-Supervised Classification," Track: Social Network Analysis and Graph Algorithms for the Web, WWW 2018, Apr. 23-27, 2018, pp. 499-508.

* cited by examiner

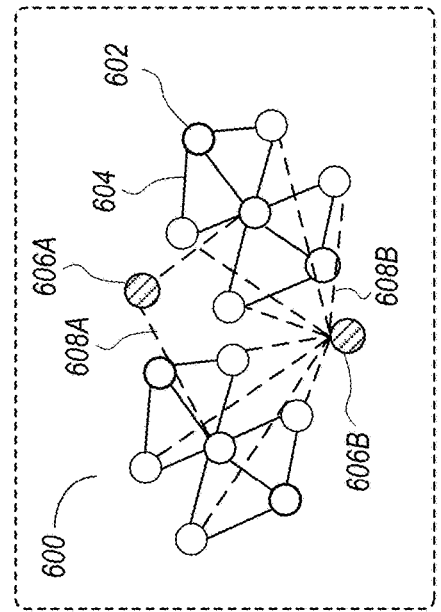
FIG. 4
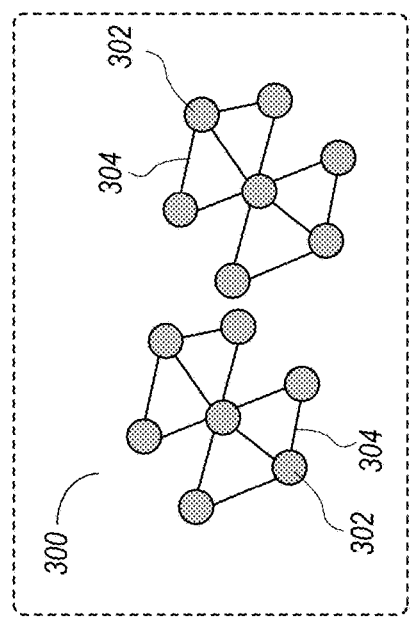
FIG. 3
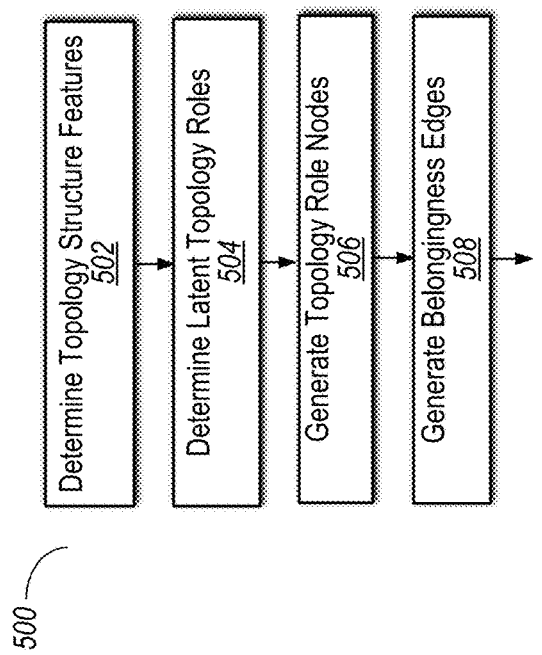
FIG. 6
FIG. 5

1300

```
┌─────────────────────────────────────────────────────────────────┐
│ Access a set of information that describes a network dataset    │
│ where the set of information includes a graph depicting a       │
│ plurality of nodes interconnected by one or more edges in the   │
│ network dataset                                                 │
│ 1302                                                            │
└─────────────────────────────────────────────────────────────────┘
                              │
                              ▼
┌─────────────────────────────────────────────────────────────────┐
│ Determine, by a first graph convolution network on the computer │
│ system, connections to neighboring nodes for the nodes in the   │
│ graph                                                           │
│ 1304                                                            │
└─────────────────────────────────────────────────────────────────┘
                              │
                              ▼
┌─────────────────────────────────────────────────────────────────┐
│ Determine, by a second graph convolution network on the         │
│ computer system, local topology structures for nodes in the     │
│ graph                                                           │
│ 1306                                                            │
└─────────────────────────────────────────────────────────────────┘
                              │
                              ▼
┌─────────────────────────────────────────────────────────────────┐
│ Determine a unified representation of the network dataset based │
│ on the determined connections for the nodes and the determined  │
│ local topology structures for the nodes where the unified       │
│ representation of the network dataset has a lower dimension     │
│ than the network dataset                                        │
│ 1308                                                            │
└─────────────────────────────────────────────────────────────────┘
```

FIG. 13

GRAPH-BASED NODE CLASSIFICATION BASED ON CONNECTIVITY AND TOPOLOGY

BACKGROUND

Technical Field

This disclosure relates generally to analyzing graphs of network datasets based on both connectivity and topology relationships between nodes in the graphs.

Description of the Related Art

Neural networks have become ubiquitous in the analysis of data. One use of neural networks involves analyzing properties or interactions of nodes in datasets to determine or predict labels for the nodes. For example, in risk assessment, the properties or interactions of nodes (representing the entities subject to risk assessment) may be analyzed to determine labels for the nodes that correspond to the risks associated with the nodes. Node classification may be a typical neural network task for determining or predicting node labels in a dataset.

In node classification, the task focuses on inspecting node properties to determine or predict labels of unclassified nodes. Recent developments have included the use of graph-based methods for node classification. For example, graph-based methods have been implemented in transaction system risk detection, social network analysis, anomaly detection, and classification of molecules. Graph-based methods, however, have encountered some limitations in the classification of nodes. Applicant recognizes that there is an opportunity to provide improved graph-based analysis for node classification, and provides solutions discussed below.

BRIEF DESCRIPTION OF THE DRAWINGS

FIG. 3 depicts an example graph of a network dataset, according to some embodiments.

FIG. 4 depicts a flow diagram illustrating an embodiment of a node connectivity determination method, according to some embodiments.

FIG. 5 depicts a flow diagram illustrating an embodiment of a topology role construction method, according to some embodiments.

FIG. 6 depicts an embodiment of a graph augmented with topology role nodes, according to some embodiments.

FIG. 13 is a flow diagram illustrating a method for determining a unified representation for a network dataset, according to some embodiments.

Figure 1A:
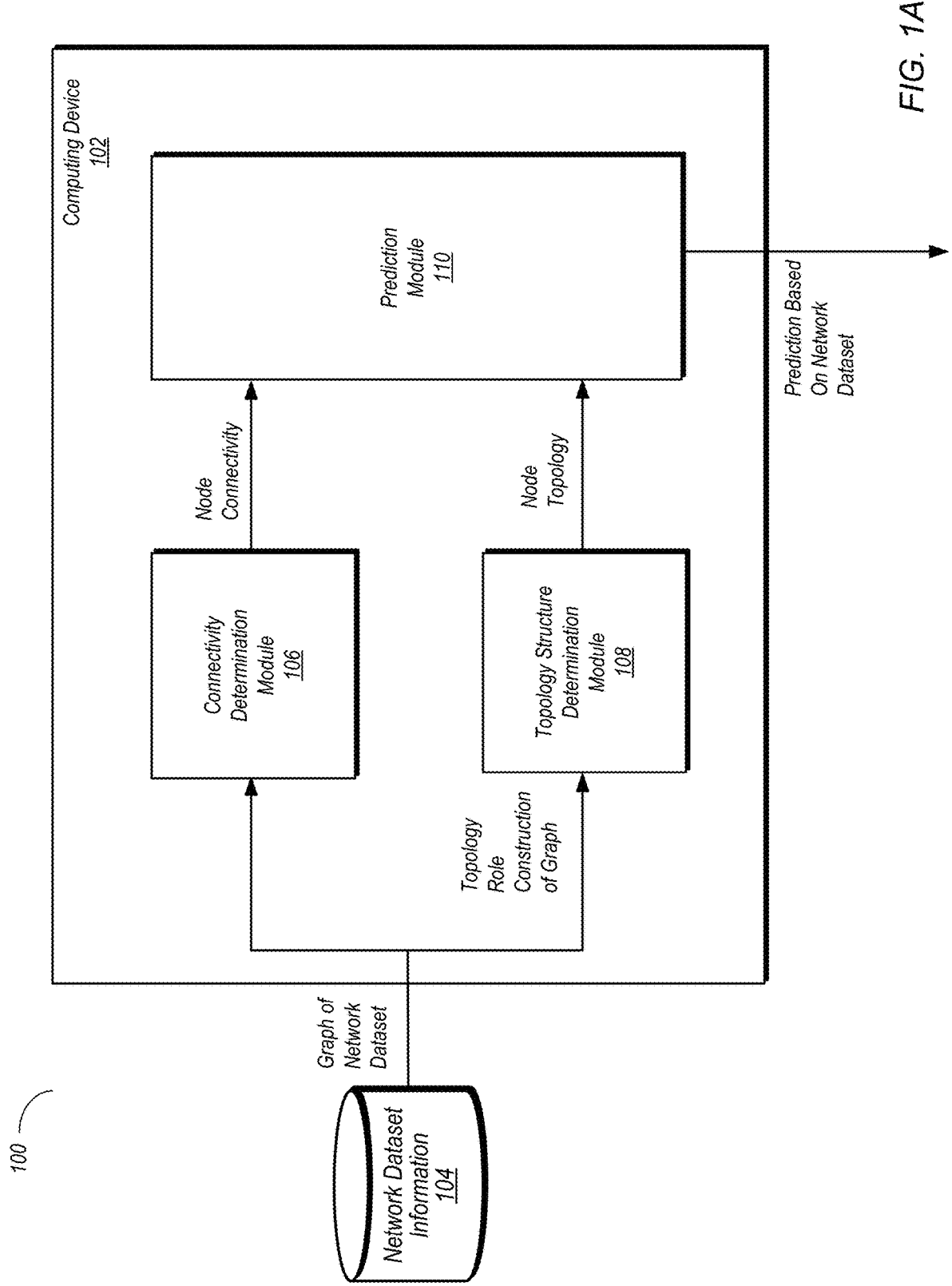
FIG. 1A is a block diagram of a service computer system for determining predictions from a graph of a network dataset, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various computer-implemented techniques related to the analysis of sets of information using graph-based convolution networks. Computer-based analysis may be useful for large sets of information, such as sets of information associated with computer-implemented services. Examples of computer-implemented services with large sets of information include, but are not limited to, transaction services, transportation services, and media services. Analysis of sets of information associated with these types of services may be useful to provide insights about the performance and operation of such services. For example, historical information for computer-implemented services may be analyzed to make predictions and adjustments related to future performance of the services.

In various embodiments, a set of information associated with a computer-implemented service includes a network dataset. As used herein, the term "network dataset" refers to any set of information that describes a plurality of entities associated with a computer-implemented service. A network dataset may be, for example, any set of information that describes a set of links or connections between pairs of entities associated with a service. In certain embodiments, a network dataset is represented as a graph. As used herein, the term "graph" refers to a data structure that indicates nodes (representing entities) connected by edges (representing links between entities). Within the meaning of this disclosure, an "entity" has its plain and ordinary meaning, and may correspond, for example, to an organization, individual, an institution, an establishment, corporate body, etc. The edges may represent, for example, transactions, files, media, information, monetary value, data, goods, services, equipment, vehicles, etc. exchanged between pairs of nodes (entities). For example, an edge between two entities may indicate that one or more transactions have been conducted between those two entities. Specific examples of entities associated with computer-implemented services are provided herein.

One example of a network dataset is a transaction dataset. In a transaction dataset, the entities (nodes in the graph) may correspond to buyers, sellers, or suppliers while the links or connections (edges in the graph) correspond to transactions between these entities. In the graph of a transaction dataset, each transaction is represented by an edge (e.g., a link or connection) between a pair of nodes (e.g., entities). In certain embodiments, a transaction may include an exchange in monetary value for a good or service in the context of a marketplace or payment service. For example, a pair of nodes may include a seller (the provider of a good or service) and a buyer (the recipient of the good or service). Some alternative embodiments of transactions may include any exchange between entities including, but not limited to, exchanges of files in a file storage service or exchanges of messages in an electronic mail service.

Another example of a network dataset is a transportation network dataset. In a transportation network dataset, the entities (nodes in the graph) may represent transportation hubs (such as airports or train stations) while the links or connections between entities (edges in the graph) correspond to transportation routes or spokes between the hubs. In the graph, each edge corresponds to a transportation route between a pair of transportation hubs (e.g., nodes) in the transportation network. Thus, a graph of a transportation dataset depicts the possible routes between a plurality of transportation hubs. In certain embodiments, the possible routes in the transportation dataset correspond to direct links between transportation hubs.

In various embodiments, computer-based analysis of a network dataset includes analysis of the graph depicting the network dataset. FIG. 1A, described in further detail below, depicts an embodiment for computer-based analysis of a network dataset through analysis of a graph. In certain embodiments, computer-based analysis includes node classification to analyze the properties or interactions of unclassified nodes in the graph and determine or predict labels or classes for the unclassified nodes. Graph-based convolution networks have been implemented on graphs of network datasets to model connectivity between nodes. The present disclosure recognizes that modelling only the connectivity between nodes may limit the effectiveness of the model in analyzing and making predictions based on the network dataset. Modelling only node connectivity may be limiting since the model only propagates information across the edges of the graph for a node and does not take into account relationships with other nodes in the graph that are not connected by the edges. The present disclosure takes into account the realization that modelling of other node properties in a graph in addition to node connectivity may be useful for improving the effectiveness of real-world analysis of network datasets associated with computer-implemented services. For example, as described herein, the present disclosure recognizes that modelling of node topology in a network dataset, in addition to modelling of node connectivity in the network dataset, may be useful for improving the effectiveness of real-world analysis of network datasets.

The present disclosure refers to the concepts of modelling "node connectivity" and "node topology" in the context of a graph representing nodes and connections between the nodes. As used herein, "node connectivity" of a particular node in the context of a graph, refers to the identities of those nodes that are connected to the particular node by edges. The nodes that are directly connected to the specific node by edges may be referred to as "neighboring nodes". Thus, two nodes are neighboring nodes when an edge is directly connected between them. In some instances, node connectivity may include connectivity relationships determined by different hops of neighbors. For example, in some implementations, neighbors of neighbors (two hops) or neighbors of neighbors of neighbors (three hops) may be modelled in node connectivity. In the context of this disclosure, modelling node connectivity, includes determining the identities of neighboring nodes (or nodes connected by neighbors) but does not take into account other relationships that the specific node may have with other nodes in the graph not connected to the specific node as a neighboring node or through neighboring nodes.

In contrast to "node connectivity," "node topology" in the context of a graph refers to determining additional information about nodes and their connections beyond the information given by node connectivity. For example, node topology may refer to determining the arrangement of a particular node and its neighboring nodes based on the structure of connections to the particular node (e.g., the number and arrangement of edges connected to the specific node). Thus, modelling node topology determines how the connections between a specific node and its neighboring nodes are arranged rather than determining the identity of the neighboring nodes as done by node connectivity. In various embodiments, modelling of node topology is implemented to determine other relationships (e.g., similarities) that the specific node may have with nodes not directly connected to the specific node, which cannot be determined by modelling only node connectivity. Node topology of a specific node may be referred to as a "local structure" or "local topology structure" of the specific node, as used herein.

A difference between node connectivity and node topology may be exemplified in the determination of similarities between nodes based on either node connectivity or node topology. For example, in the context of node connectivity, two nodes may be considered similar if the two nodes have the same set of neighboring nodes. Contrarily, in the context of node topology, two nodes may be considered to have similar local topology structures when the two nodes have similar numbers or arrangements of edges connected to the two nodes. The determinations of similarities between nodes by either node connectivity or node topology are described further in the following example of FIG. 1B.

Figure 1B:
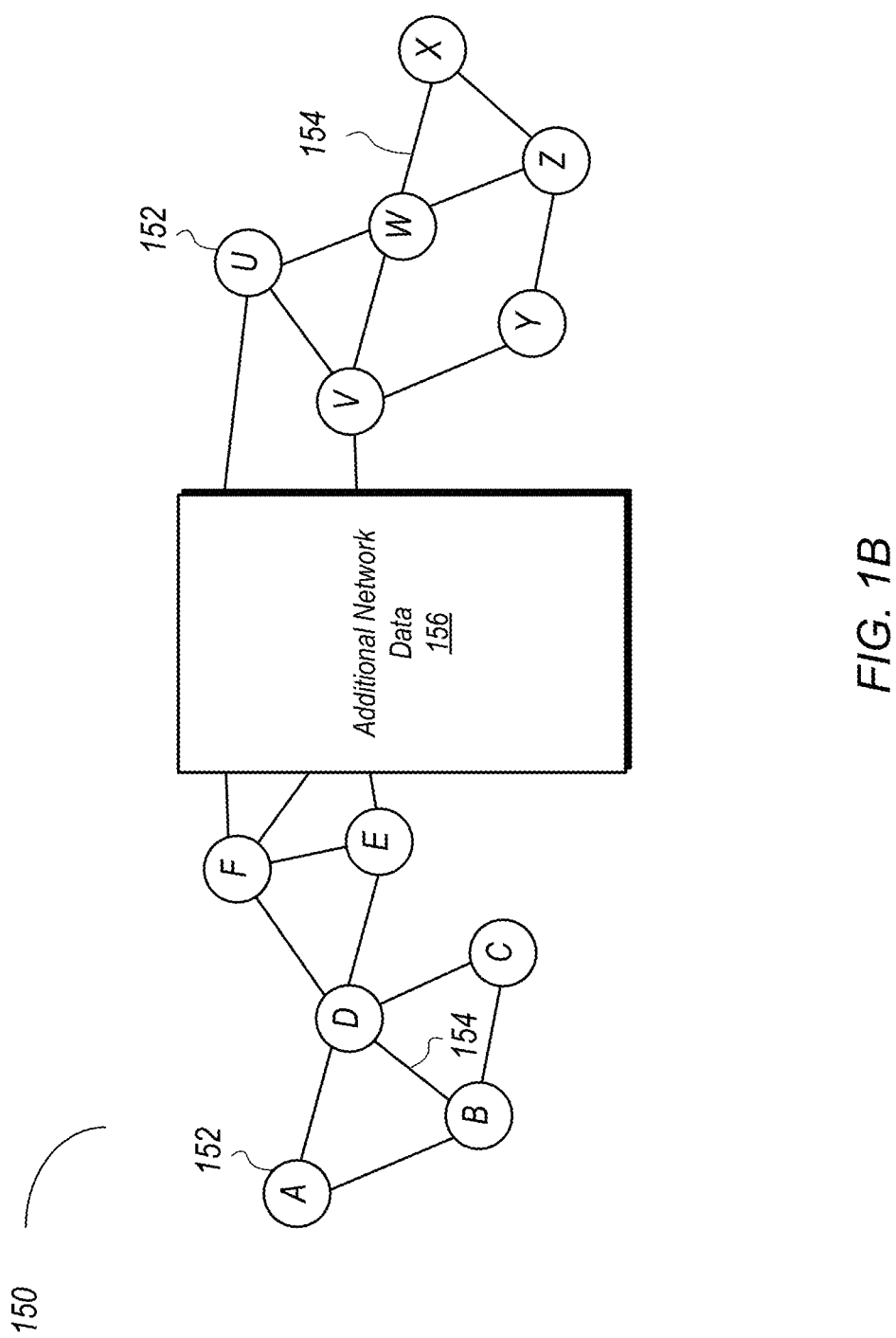
FIG. 1B depicts an example graph of a network dataset.

FIG. 1B depicts an example graph of a network dataset. Graph 150, and the following description, are provided to exemplify the differences between node connectivity and node topology. Graph 150 includes nodes 152 connected by edges 154. In the illustrated embodiment, graph 150 includes nodes A, B, C, D, E, F on a first side of the network and nodes U, V, W, X, Y, and Z on a second side of the network with additional network data 156 separating the depicted groups of nodes. In this example, a graph-based convolution network modelling node connectivity, as described herein, may determine the identity of the nodes and their corresponding neighboring nodes in graph 150. For node connectivity, node D may be identified as having direct connections (by edges) to nodes A, B, C, E, and F while node W may be identified as having direct connections (by edges) to nodes U, V, X, and Z by a graph-based convolution network modelling node connectivity. As discussed above, modelling only the connectivity, however, only determines the identity of a node and its neighboring nodes and does not take into account other relationships between an identified node and other nodes not directly connected to the identified node in graph 152. For example, in FIG. 1B, modelling node connectivity determines the identity of node D and its neighboring nodes A, B, C, E, and F. It should be noted that there are not any nodes in FIG. 1B that have similar node connectivity to node D as there are no nodes with the same set of neighboring nodes A, B, C, E, and F. Thus, modelling only node connectivity does not provide for the determination of any relationships between node D and nodes on the other side of the network dataset (such as node W) that are not directly connected to node D.

In the example of FIG. 1B, a graph-based convolution network modelling node topology, as described herein, may be implemented to determine additional information about nodes in graph 150 and their connections beyond the information above determined by node connectivity modelling. For example, modelling node topology may determine the local topology structures of node in graph 150 based on the number and arrangement of edges connected to the nodes. Similarities between nodes may be determined based on similar node topologies (e.g., local topology structures). For example, in FIG. 1B, node D and node W are not directly connected and reside far apart in the network (separated by additional network data 156). Node D and node W may, however, have similar local topology structures (e.g., similar arrangements or numbers of connections to their neighboring nodes) as determined by modelling node topology. In the illustrated example, node D and node W have similar numbers of neighboring nodes (5 and 4, respectively), are connected to similar numbers of triangles (3 and 2, respectively), and are connected to the rest of the network (additional network data 156) by two nodes (nodes F, E and nodes U, V, respectively). The numbers and arrangements of the connections to node D and node W may be determined without identifying the nodes connected to node D and node W. Since node D and node W do not have any common neighboring nodes, modelling only the node connectivity in graph 150 does not take into account the similarities in the local topology structures of the nodes.

One example of a network dataset where improving the effectiveness of real-world analysis may be useful is a transaction dataset. In the case of a transaction dataset, analysis of both node connectivity and the node topology in the transaction dataset may be useful in risk detection for a transaction service. The transaction service may be associated with large number of sellers and transactions. Risk assessment for a seller may be useful in determining whether a relationship with the seller should be continued, terminated, or monitored more closely. High risk sellers may include, for example, sellers that may result in revenue loss due to a variety of reasons such as, but not limited to, fraud, bankruptcy, or bad supply chain. Analysis of a transaction dataset may provide insight such as predictions of sellers that may have high risk for revenue loss. In order to make better predictions for real-world situations, both sellers' connectivity relationships (e.g., node connectivity) as well as similarities in their local topology structures (e.g., node topologies) may be considered. A seller's connectivity relationship may include, for example, interactions with other sellers, buyers, and suppliers. Similarities in sellers' local topology structure may include, for example, similarities on business models as supplier, drop-shipper, or retailer). The disclosed embodiments recognize, however, that existing graph-based convolution networks are limited in their handling of both node connectivity and node topology.

One embodiment described herein has three broad components: 1) determining connections to neighboring nodes (e.g., node connectivity) for the nodes in the graph using a first graph-based convolution network such as a connectivity graph convolution network (C-GCN), 2) determining local topology structures (e.g., node topology) for nodes in the graph using a second graph-based convolution network such as a topology graph convolution network (T-GCN), and 3) determining predictions for the graph that are based on the node connectivity and the node topology. In various embodiments, the combination of using a C-GCN and a T-GCN to model both node connectivity and node topology, respectively, in a dual-path convolution, as described herein, improves the effectiveness in making predictions for a graph. A single graph of a network dataset may be accessed for input into both the C-GCN and the T-GCN. In some embodiments, the graph is augmented for input into the T-GCN based on role-based convolution (e.g., topology role construction of the graph). Augmentation of the graph based on topology role construction may include augmenting the graph with topology role nodes, which are based on topology structure features of the nodes in the graph, and belongingness edges that connect nodes with their corresponding topology role nodes.

FIG. 1A is a block diagram of a service computer system for determining predictions from a graph of a network dataset, according to some embodiments. As used herein, the term "service computer system" refers to any computer system that implements a service in which two or more parties use computer systems to exchange information. Accordingly, a "service" according to this disclosure may include a transaction service, a payment service (e.g., PAY-PAL), a transportation service, a media network, a social network, a file transfer service, an online retailer, a dating site, and so on. Note that generally, this disclosure may include various examples and discussion of techniques and structures within the context of a "service computer system." Note that all these examples, techniques, and structures are generally applicable to any computer system that has a flow of information between different entities. However, the term service computer system is used for ease of understanding in various portions of this disclosure.

In the embodiment shown in FIG. 1A, service computer system 100 includes computing device 102. As described herein, computing device 102 may operate to access a network dataset from network dataset information 104 and determine one or more predictions based on the network dataset. The predictions determined by computing device 102 may be used to make decisions or take actions regarding service computer system 100. For example, the predictions may be used to make decisions about making changes or updates to items in service computer system 100 such as account status, schedules, or information flow. In some embodiments, a prediction may include a probability of an outcome related to an item such as a risk that a seller of a good or service will result in revenue loss for the service associated with service computer system 100. In such embodiments, the prediction of risk may be used, for example, to make decisions on whether to continue or terminate a relationship between the seller and the service, or whether to monitor the seller more closely for a period of time. The disclosure, however, is not limited to these particular examples.

In certain embodiments, computing device 102 includes connectivity determination module 106, topology structure determination module 108, and prediction module 110. Connectivity determination module 106, topology structure determination module 108, and prediction module 110 may be implemented as computer-executable instructions on computing device 102. In the illustrated embodiment of FIG. 1A, computing device 102 accesses a graph of a network dataset from network dataset information 104. In some embodiments, the graph of the network dataset is accessed directly from network dataset information 104 by computing device 102. For example, graphs of network datasets may be stored in network dataset information 104 and accessed as graphs by computing device 102 or other computing devices. In some embodiments, computing device 102 accesses the network dataset as a set of data from network dataset information 104 and then generates a graph of the network dataset on computing device 102. For example, computing device 102 may access a network dataset as a set of data describing pairs of entities with links between the entities. Computing device 102 may then generate a graph based on the accessed network dataset.

Having accessed or generated a graph of a network dataset, computing device 102 may provide the graph to connectivity determination module 106 and topology structure determination module 108, as shown in FIG. 1A. In certain embodiments, a topology role construction of the graph is provided as input into topology structure determination module 108. A topology role construction of the graph may be an augmented graph that includes nodes and connections related to topology roles of the network dataset. Topology role construction of the graph is described in further detail below.

From the graph of the network dataset, connectivity determination module 106 may determine node connectivity (e.g., connections to neighboring nodes for the nodes) in the network dataset and topology structure determination module 108 may determine local node topology (e.g., local topology structures for the nodes). In certain embodiments, connectivity determination module 106 and topology structure determination module 108 implement graph-based convolution networks to determine node connectivity and node topology. For example, connectivity determination module 106 may implement a connectivity graph convolution network (C-GCN) and topology structure determination module 108 may implement a topology graph convolution network (T-GCN), as described herein.

In the illustrated embodiment, node connectivity and node topology for the network dataset determined by connectivity determination module 106 and topology structure determination module 108, respectively, are provided to prediction module 110. Prediction module 110 may determine one or more predictions for the network dataset based on both the node connectivity and node topology. As discussed in further detail herein, prediction module 110 may include a multi-head attention network implemented to determine predictions based on the node connectivity and the node topology output from connectivity determination module 106 and topology structure determination module 108, respectively. The multi-head attention network may determine predictions for the graph by aligning both the node connectivity for nodes in the graph (determined by connectivity determination module 106) and similarities in node topologies (e.g., local topology structures) for the nodes in the graph (determined by topology structure determination module 108).

In certain embodiments, as described in further detail herein, connectivity determination module 106, topology structure determination module 108, and the multi-head attention network in prediction module 110 implement multilayer networks. In such embodiments, the output from a layer of the multi-head attention network in prediction module 110 may be used as inputs into a subsequent layer of both the C-GCN implemented in connectivity determination module 106 and the T-GCN implemented in topology structure determination module 108. Sharing the output from previous layers of the multi-head attention network as input for subsequent layers in both the C-GCN and the T-GCN may interactively optimize the output of subsequent layers of the multi-head attention network as the C-GCN and the T-GCN mutually reinforce each other towards alignment (e.g., towards a common classification objective for use in determining a prediction).

In short, the disclosed embodiments recognize the benefits of graph-based analysis of both connectivity properties of nodes and topology properties of nodes in network datasets to provide more accurate and more realistic (e.g., more real-world based) predictions from the network datasets. In addition, the disclosed embodiments recognize that topology role construction of the graph for input into a T-GCN may be beneficial by making the determination of local topology structures more efficient. For example, topology role construction of the graph may reduce the computations required by the T-GCN while preserving or retaining all convolution paths between nodes that are similar in topology structure.

Figure 2:
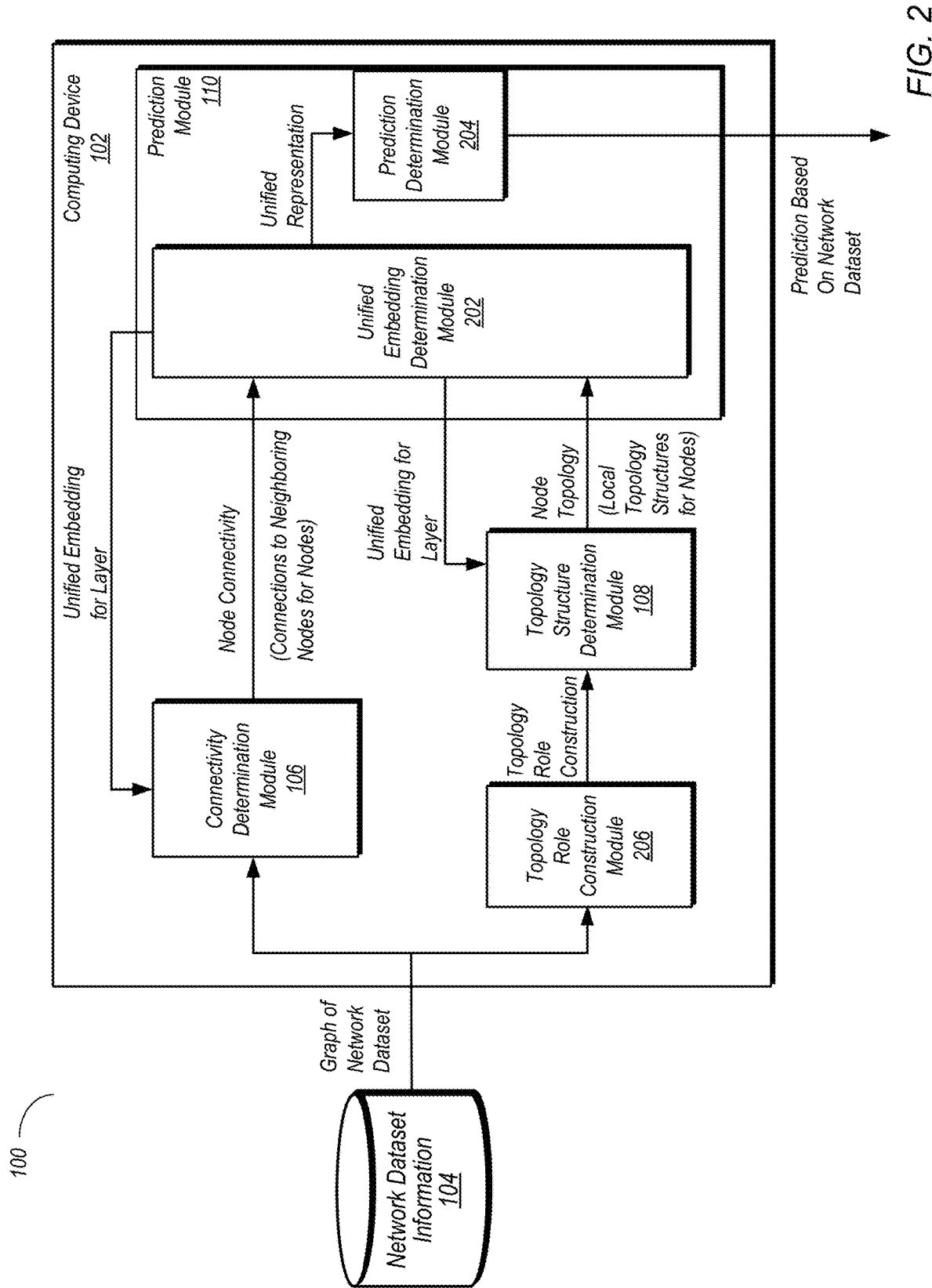
FIG. 2 is another block diagram of a service computer system for determining predictions from a graph of a network dataset, according to some embodiments.

Turning to FIG. 2, another block diagram of service computer system 100 and computing device 102, according to some embodiments, is illustrated. Similar to the embodiment illustrated in FIG. 1A, computing device 102 accesses a graph of a network dataset from network dataset information 104 in the illustrated embodiment of FIG. 2. As described above, in some embodiments, computing device 102 generates a graph for a network dataset accessed from network dataset information 104. FIG. 3 depicts an example graph of a network dataset, according to some embodiments. Graph 300 includes nodes 302 connected by edges 304. It is to be understood that graph 300 is a simple representation of a graph for the purposes of the current disclosure and that many real-world graphs may be more complex in nature.

In certain embodiments, a network graph (such as graph 300) is represented as G=(V,E), where V denotes the set of nodes and E denotes the set of edges. From this, graph connectivity information may be represented by a |V| by |V| adjacency matrix $A_C$, where $A_C$ $[v_i]$ $[v_j]$=1 if $v_i$ and $v_j$ are connected. Further, each node may be associated with node features. $F \in R^{|V| \times d}$ may be used to denote the feature matrix, where d is the feature dimension. In some embodiments, node features are the features that are specific to each individual node (e.g., demographic features of sellers in a payment service network). Node features may thus not be related to the graph connectivity. In some related graph convolution network embodiments, a non-feature option may be supported. In such embodiments, an Identity matrix or random matrix is used as feature matrix F. In embodiments described herein, both the node features F and the graph G are taken as input to predict the label associated with each node.

Returning to FIG. 2, in the illustrated embodiment, system 100 implements a graph convolution framework on computing device 102 with connectivity determination module 106, topology structure determination module 108, and prediction module 110. In certain embodiments, prediction module 110 includes unified embedding determination module 202 and prediction determination module 204. Unified embedding determination module 202 may be a multi-head attention network, described herein. As used herein, any of connectivity determination module 106, topology structure determination module 108, and prediction module 110 (including unified embedding determination module 202 and prediction determination module 204) may be implemented as a machine learning module. A machine learning module may include any combination of hardware or software (e.g., program instructions) located on computing device 102. A machine learning module may be, for example, a neural network module.

To determine node representations (a "unified representation" in the illustrated embodiment) from unified embedding determination module 202, initial node representations (e.g., node connectivity and node topology) are determined from the initial input of the graph. Node connectivity is determined by connectivity determination module 106 and node topology is determined by topology structure determination module 108 through a dual-path convolution process. In certain embodiments, the outputs from both connectivity determination module 106 and topology structure determination module 108 are aligned by unified embedding determination module 202. Unified embedding determination module 202 may automatically adjust the importance of outputs from connectivity determination module 106 and topology structure determination module 108, and learn the unified embedding representations of nodes. The unified embeddings may then be used as input for the next layer of dual-path convolution in connectivity determination module 106 and topology structure determination module 108. The unified embeddings for each layer determined by unified embedding determination module 202 are used as input for successive layers of the dual-path convolution until a final layer of the dual-path convolution is reached and a final unified representation is determined by unified embedding determination module 202. The final unified representation may be provided to prediction determination module 204 to determine a final prediction for the network dataset input (e.g., the graph input). Prediction determination module 204 may implement a classification network to determine the final prediction, as described below.

In short, computing device 102 may simultaneously learn the connectivity and the local topology structure of the input graph in the end-to-end procedure of the dual-path convolution illustrated in FIG. 2. In the illustrated embodiment, the dual-path convolution includes convolution of the graph using both connectivity determination module 106 and topology structure determination module 108. With both connectivity determination module 106 and topology structure determination module 108 receiving, as input, unified embedding from a previous layer of unified embedding determination module 202, the connectivity determination module 106 and the topology structure determination module 108 may mutually reinforce each other towards the final unified representation determined by the unified embedding determination module.

Turning to connectivity determination module 106, the connectivity determination module 106 may include a C-GCN (connectivity graph convolution network), as described herein. Graph convolution networks (GCNs) are deep learning networks implemented for the task of node classification. A GCN learns node representations (e.g., connectivity or topology) by aggregating a node's local neighborhood through functions in layers. Thus, a C-GCN learns node representations for connectivity by aggregating functions through one or more layers. In some embodiments, connectivity determination module 106 is a multi-layer C-GCN. In a multi-layer C-GCN, as described herein, connectivity determination module 106 implements multiple connectivity convolution layers to determine node connectivity. In certain embodiments, connectivity determination module 106 implements standard graph convolution to determine node connectivity (e.g., connections between nodes) in the graph using multiple connectivity convolution layers. Other methods for determining node connectivity may also be contemplated. For example, node connectivity embedding using skip-gram models may be contemplated to determine node connectivity.

FIG. 4 depicts a flow diagram illustrating an embodiment of a node connectivity determination method, according to some embodiments. In various embodiments, method 400 is implemented by connectivity determination module 106, which is operating as a multi-layer C-GCN. The input to a connectivity convolution layer may include the node feature matrix F, which represents the initial nodes' embeddings. All nodes connectivity information may be stored in the adjacent matrix, $A_C$. Thus, convolution may be directly applied based on $A_C$. In certain embodiments, in 402, a symmetric normalizing equation is used to normalize $A_C$ to avoid changing the scale of a feature vector:

$$\hat{A}_c = \hat{D}^{-1/2}(A_c + I)\hat{D}^{-1/2};\quad\text{Equation 1:}$$

where $\hat{D}$ is the diagonal degree matrix and I is the Identity matrix. The Identity matrix may be added to include each node's self-feature into convolution. Each convolution layer takes the input from the previous layers and generates node level embedding, $F^{(l+1)}$. In 404, the node connectivity convolution may be determined. The computation of the node connectivity convolution may be defined as:

$$F_c^{l+1} = \sigma(\hat{A}_c H^l W).\quad\text{Equation 2:}$$

In equation 2, W is the weight matrix and l denotes the l-th convolution layer. $H^l$ denotes the unified embedding for a previous layer received from unified embedding determination module 202, as described herein, with the only exception being that for the first layer, $H^l = F$. The output of method 400 and connectivity determination module 106 (the C-GCN), $F_C^{l+1}$ is the node connectivity that defines connections to neighboring nodes for the nodes in the graph. As shown in FIG. 2, the output of connectivity determination module 106 may be fed into unified embedding determination module 202 along with the output of topology structure determination module 108 (described below) to produce an updated unified embedding, $H^{l+1}$. Feeding the unified embedding layer determined by unified embedding determination module 202 into successive layers of the C-GCN differs from conventional convolution layers that use node level embedding $F^l$ for input into successive layers. As described herein, feeding the unified embedding layer determined by unified embedding determination module 202 into successive layers of the C-GCN and the T-GCN provides mutual reinforcement between the C-GCN and the T-GCN as their outputs are aligned by the unified embedding determination module.

Turning now to topology structure determination module 108, the topology structure determination module is implemented to determine local topology structures for the nodes in the graph and the similarities between the local topology structures. Local topology structures may be determined based on the arrangement of the nodes and edges in the graph. The local topology structures may be fine-tuned during convolution by topology structure determination module 108 before being integrated into the unified embeddings. One possible embodiment to model topology structure by graph convolution is to generate "augmented paths" between nodes that share similar topology structures. These augmented paths may create "neighborhoods" for nodes that are similar in terms of local topology structures. Thus, graph convolution may aggregate nodes along the augmented paths to naturally learn the node embedding based on topology structure similarity.

In some embodiments, a threshold-based convolution model may be designed based on the augmented path strategy. A first step in the threshold-based convolution model may leverage local topology structure embedding algorithms to generate node topology structure features. A second step in the threshold-based convolution model may calculate pair-wise similarity between nodes based on the topology structure features. A third step in the threshold-based convolution model may create augmented paths between nodes when their topology structure similarity is larger than a predefined threshold. A fourth step in the threshold-based convolution model may perform graph convolution on the augmented paths to fine-tune the node topology structure embedding for classification.

In the threshold-based convolution model, a topology structure adjacency matrix, $A_t$, may be derived to capture the augmented paths between nodes. Then the convolution in Equation 1 above may be applied on the augmented paths (e.g., by replacing $A_c$ with $A_t$) to determine the local topology structures. While the threshold-based convolution model may be straightforward and easy to implement, the threshold-based convolution model has a requirement of $O(n^2)$ time complexity to evaluate the topology structure similarity between all pairs of n nodes in the graph. Thus, for large graphs, the computational costs may limit the applicability of the threshold-based convolution model as it can be impractical to evaluate and generate the augmented paths between every pair of nodes.

In certain embodiments, computing device 102 implements a two-step topology role convolution process to determine local topology structures and their similarities. The two-step topology role convolution process may be useful for large graphs that are typical for network datasets associated with computer-implemented services. The two-step topology role convolution process may be implemented to determine topology role constructions from a graph using topology role construction module 206, as shown in FIG. 2. The topology role constructions are then input into topology structure determination module 108 (e.g., the T-GCN) for convolution and to determine the local topology role structures for the nodes in the graph (e.g., node topology).

FIG. 5 depicts a flow diagram illustrating an embodiment of a topology role construction method, according to some embodiments. As described above, topology role construction method 500 of a graph may be implemented by topology role construction module 206, shown in FIG. 2. A thrust of topology role convolution may be to summarize and model node topology structure with latent topology roles. In topology role construction method 500, topology role may be defined as a high-level representation of underlying topology structure identities of nodes (which may be similar to considering a centroid of a cluster of nodes).

In 502, topology structure features for each node in the graph are determined. Examples of methods for determining topology structure features for a graph include, but are not limited to, Struc2vec, GraphWave, and Role2Vec. With the topology structure features determined, in 504, latent topology roles are determined from the topology structure features. The latent topology roles may be determined, for example, by either clustering or classification on the topology structure features. Topology roles determined by clustering may preserve the original graph properties. Topology roles determined by classification may be directly mapped into a task-related space (e.g., node classification).

In 506, topology role nodes (e.g., dummy nodes) may be generated on the graph to represent the determined topology roles. FIG. 6 depicts an embodiment of a graph augmented with topology role nodes, according to some embodiments. Graph 600 may include nodes 602 and edges 604, which correspond to nodes 302 and edges 304, respectively, in graph 300 (shown in FIG. 3). Topology role nodes 606A and 606B are placed on graph 600 to represent the determined topology roles.

Turning back to FIG. 5, in 508, belongingness edges are generated between topology role nodes and their member nodes (e.g., nodes 602 in the original graph that have a determined topology role). As used herein, the term "belongingness edges" refers to edges in a graph that connect a node to its corresponding topology role node. The addition of the belongingness edges produces a topology role construction from topology role construction method 500. In FIG. 6, belongingness edges 608A are connected to topology role node 606A and belongingness edges 608B are connected to topology role node 606B. Belongingness edges 608A, 608B are generated to retain the topology structure similarities between member nodes (e.g., nodes 602). For example, when two nodes 602 are similar based on their topology structure features, the two nodes connect to the same topology role node through belongingness edges.

As shown in FIG. 2, the topology role construction determined by topology role construction module 206 may be provided to topology structure determination module 108. Topology structure determination module 108 may include a T-GCN (topology graph convolution network), as described herein. For example, topology structure determination module 108 may be a multi-layer T-GCN. Convolution with topology roles may simultaneously extract the topology roles' representations and fine-tune their member nodes' embeddings through the convolution process.

Figure 7:
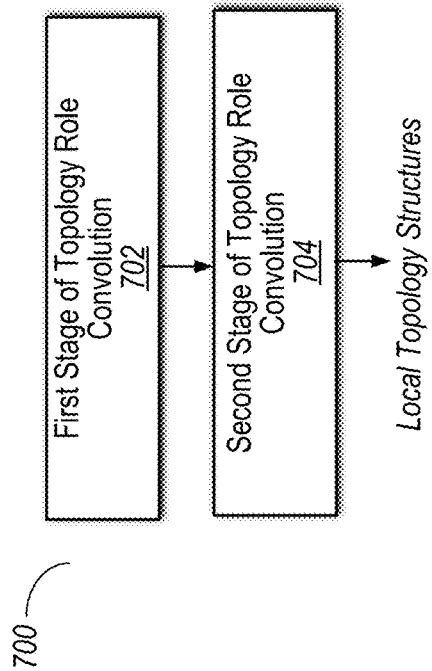
FIG. 7 depicts a flow diagram illustrating an embodiment of a topology role convolution, according to some embodiments.
Figure 8:
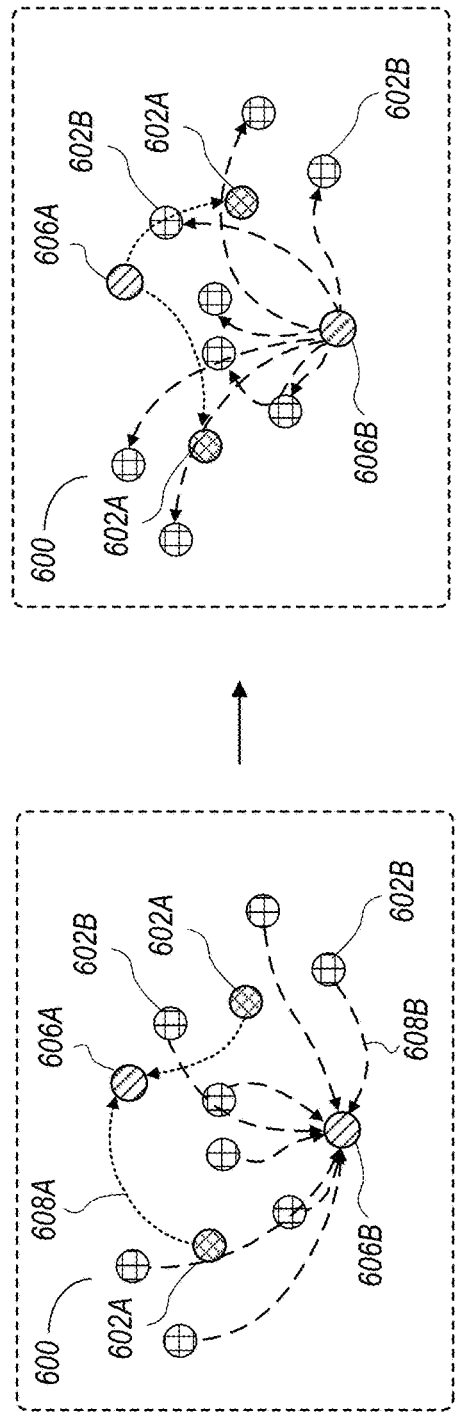
FIG. 8 depicts an embodiment of a graph during a first stage of topology role convolution.

In certain embodiments, the convolution to determine node embedding for topology proceeds in two stages. FIG. 7 depicts a flow diagram illustrating an embodiment of a topology role convolution, according to some embodiments. Topology role convolution 700 may be implemented by topology structure determination module 108, shown in FIG. 2. A first stage of topology role convolution 700 is implemented in 702. FIG. 8 depicts an embodiment of graph 600 during first stage 702 of topology role convolution 700. In first stage 702, information is propagated from member nodes 602 to topology role nodes 606 through belongingness edges 608. For example, as shown in FIG. 8, information is propagated from nodes 602A to topology role nodes 606A through belongingness edges 608A and information is propagated from nodes 602B to topology role nodes 606B through belongingness edges 608B.

Propagating information from the member nodes to the topology role nodes may learn/update the embedding representations for topology roles. The convolution on each topology role $r_i \in R$ may be expressed by:

$$r_i^{l+1} = \sigma\left(\frac{1}{|mr(i)|} \cdot W \sum_{i \in m_r(i)} h_i^l\right);$$ Equation 3 where l denotes the l-th convolution layer, W is the weight parameter, and $m_r(i)$ denotes the member nodes of role i. Similarly, the input to successive topology role convolution layers (l>1) may be the unified node embedding, described herein, h∈H.

Figure 9:
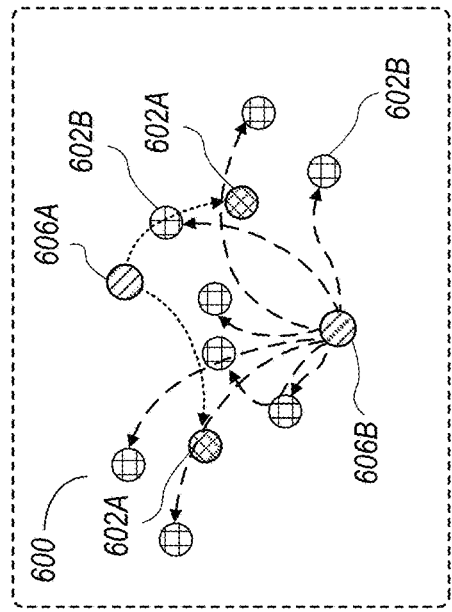
FIG. 9 depicts an embodiment of a graph during a second stage of topology role convolution.

Returning to FIG. 7, a second stage of topology role convolution 700 is implemented in 704. FIG. 9 depicts an embodiment of graph 600 during second stage 704 of topology role convolution 700. In second stage 704, information is back-propagated from topology role nodes 606 to their member nodes 602. For example, as shown in FIG. 9, information is back-propagated from topology role nodes 606A to nodes 602A and information is back-propagated from topology role nodes 606B to nodes 602B. The back-propagation may fine-tune the embeddings of member nodes 602 from their topology roles.

In second stage 704, the underlying topology roles may be assumed to be non-overlapping. Thus, a sharing scheme may be used for back-propagation. For example, nodes 602 may inherit the topology structure embeddings directly from their connected topology roles. During implementation of second stage 704, the overall topology role convolution may be transformed into corresponding matrix multiplications as follows:

$$R^{l+1} = \sigma(\hat{A}_r H^l W);$$ Equation 4:

where $R^{l+1}$ is the embedding matrix of topology roles and $\hat{A}_r$ is the $|R| \times |N|$ normalized membership matrix for topology roles. We may then determine the topology embedding for each member node (e.g., the local topology structures) by:

$$F_t^{l+1} = \hat{A}_t^T R^{l+1};$$ Equation 5:

where $(\bullet)^T$ denotes the transpose function. It should be noted that topology role embedding may be shared among all the member nodes and we may assume topology roles are non-overlapping such that $\hat{A}_t^T = A_t^T$.

Topology role convolution may be an effective way to model topology structure similarity between nodes. Using topology roles may preserve the information propagation paths for all nodes that are similar in topology structures. As the topology role convolution follows the belongingness edges and each node has only one belongingness edge to its corresponding topology role node, the complexity for the convolution is O(m+n) for a graph with n nodes and m topology roles. It should be noted that the total number of topology roles may be bounded by O(n). In a worst case, each node may be modelled by an individual topology role. In such a case, however, the topology structure information becomes trivial as no pair of nodes share similar topology structure.

While the embodiments described herein to construction and convolution of topology structure to determine node topology (e.g., local topology structures for nodes and their similarities), it should be understood that embodiments that determine other node properties besides topology structure may be contemplated. For example, the framework for topology structure described above may be generalized for other node properties such as, but not limited to, node community identity (e.g., nodes in the same community may be similar). Additionally, the above-described framework may be extendable to multi-path convolution frameworks that model node connectivity, node topology, other node properties, or combinations thereof.

Turning back to FIG. 2, the output of topology structure determination module 108 (the T-GCN), $F_t^{l+1}$, is the node topology (e.g., local topology structures for the nodes) that defines topology roles of the nodes and their similarities in the graph. The output of topology structure determination module 108 may be fed into unified embedding determination module 202 along with the output of connectivity determination module 106 (described above) to produce the updated unified embedding, $H^{l+1}$ (e.g., the "unified embedding layer" shown in FIG. 2). The unified embedding layer may be fed into successive layers of topology structure determination module 108 along with connectivity determination module 106, as described above, until a final unified representation is determined by unified embedding determination module 202.

Turning now to unified embedding determination module 202, unified embedding determination module 202 may be implemented to correlate the outputs of connectivity determination module 106 and topology structure determination module 108 to a single, unified output. In some embodiments, unified embedding determination module 202 correlates the outputs of connectivity determination module 106 and topology structure determination module 108 by adjusting the importance between the node connectivity relationships and the node topology structure similarities in each layer of the dual-path convolution.

Figure 10:
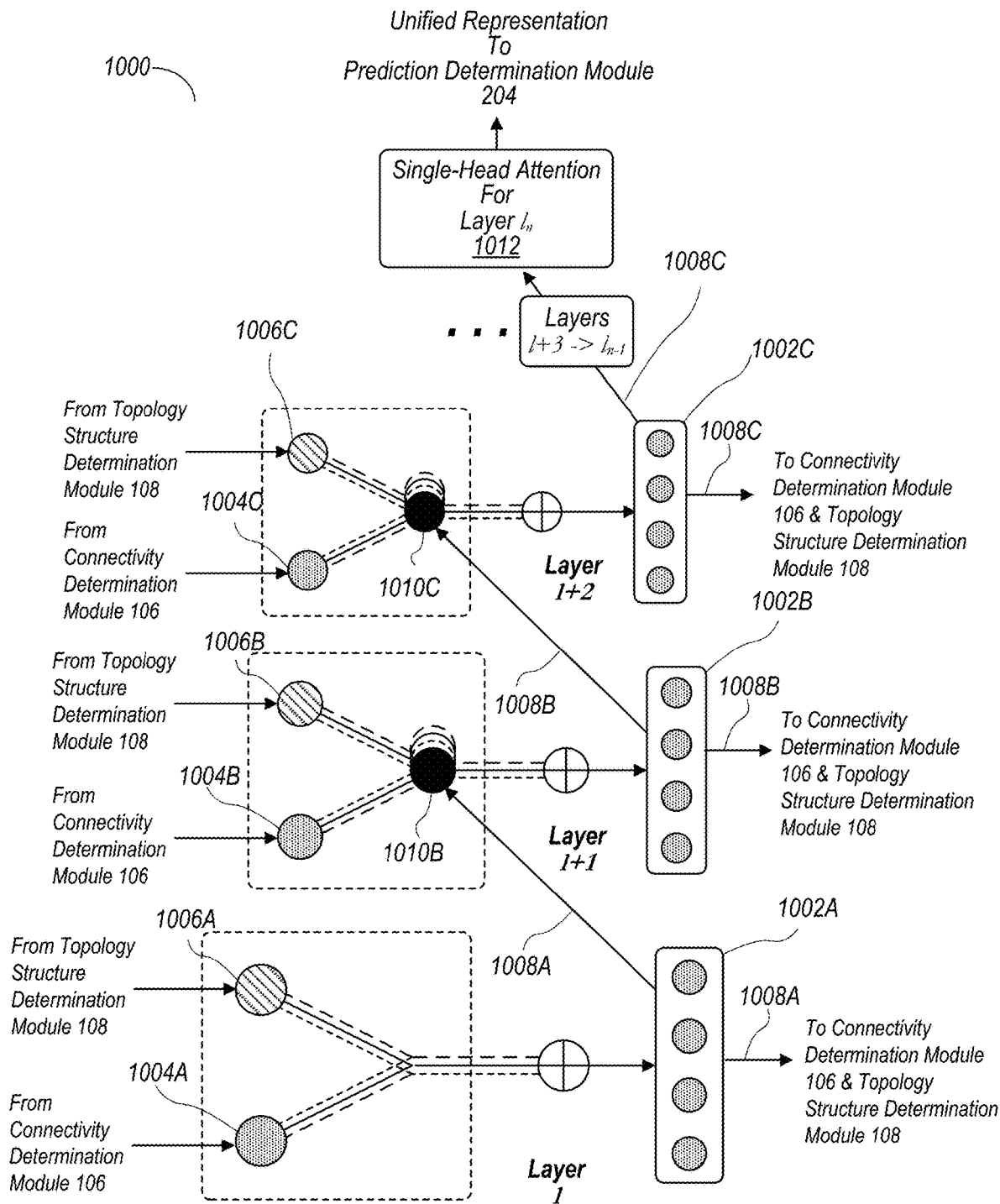
FIG. 10 depicts a representation of an embodiment of implementing a multi-head attention network mechanism in a unified embedding determination module across multiple dual-path convolution layers.

In certain embodiments, unified embedding determination module 202 implements a multi-head attention network mechanism (e.g., a multi-head self-attention network mechanism). FIG. 10 depicts a representation of an embodiment of implementing a multi-head attention network mechanism in unified embedding determination module 202 across multiple dual-path convolution layers. In the illustrated embodiment, multi-head attention network mechanism 1000 includes layer multi-head attention mechanisms 1002. Layer multi-head attention mechanisms 1002 may determine unified embedding outputs based on outputs of connectivity determination module 106 (the C-GCN) and topology structure determination module 108 (the T-GCN) along with unified embedding outputs from previous layers, as described below.

In a first dual-path convolution layer ("Layer l"), node 1004A represents the output embedding from a first layer of connectivity determination module 106 (the C-GCN) and node 1006A represents the output embedding from a first layer of topology structure determination module 108 (the T-GCN). The outputs associated with node 1004A and node 1006A may be correlated in layer multi-head attention mechanism 1002A. Layer multi-head attention mechanism 1002A may determine unified embedding 1008A for the first dual-path convolution layer ("Layer l"). In certain embodiments, the output of unified embedding 1008A from the first dual-path convolution layer ("Layer l") is fed into the next (successive) convolution layer for both connectivity determination module 106 and topology structure determination module 108 (also shown in FIG. 2). As described above for Equations 2 and 4, the unified embedding from a preceding dual-path convolution layer (represented by $H^l$) may be implemented in the determination of the outputs of connectivity determination module 106 and topology structure determination module 108 for a successive dual-path convolution layer. Thus, unified embedding 1008A from the first dual-path convolution layer ("Layer l") may be used in determining the output of connectivity determination module 106 (represented by node 1004B) and the output of topology structure determination module 108 (represented by node 1006B) for the next dual-path convolution layer ("Layer l+1").

As shown in FIG. 10, in certain embodiments, unified embedding 1008A from the first dual-path convolution layer ("Layer l") is fed into and used as input (represented by node 1010B) for the next (second) dual-path convolution layer ("Layer l+1") along with the outputs of the second convolution layers of connectivity determination module 106 and topology structure determination module 108 (represented by nodes 1004B and 1006B, respectively). The outputs associated with node 1004B and node 1006B may be correlated with unified embedding 1008A associated with node 1010B in layer multi-head attention mechanism 1002B, as described below. Layer multi-head attention mechanism 1002B may determine unified embedding 1008B for the second dual-path convolution layer ("Layer l+1"). As described for the first dual-path convolution layer, the output of unified embedding 1008B from the second dual-path convolution layer ("Layer l+1") may be fed into the next (successive) convolution layer for both connectivity determination module 106 and topology structure determination module 108.

Unified embedding 1008B from the second dual-path convolution layer ("Layer l+1") may be used in determining the output of connectivity determination module 106 (represented by node 1004C) and the output of topology structure determination module 108 (represented by node 1006C) for the third dual-path convolution layer ("Layer l+2"). In the third dual-path convolution layer, unified embedding 1008B from the second dual-path convolution layer ("Layer l+1") is fed into and used as input (represented by node 1010C) along with the outputs of the third convolution layers of connectivity determination module 106 and topology structure determination module 108 (represented by nodes 1004C and 1006C, respectively). The outputs associated with node 1004C and node 1006C may be correlated with unified embedding 1008B associated with node 1010C in layer multi-head attention mechanism 1002C. Layer multi-head attention mechanism 1002C may determine unified embedding 1008C for the third dual-path convolution layer ("Layer l+2").

As described above, the output of unified embedding 1008C from the third dual-path convolution layer ("Layer l+2") may be fed into the next (successive) convolution layer for both connectivity determination module 106 and topology structure determination module 108 and also may be fed into and used as input for the next layer of the multi-head attention mechanism (e.g., ("Layer l+3"). The above steps may be repeated for each additional convolution layer in the dual-path convolution network up to a penultimate convolution layer ("Layer $l_{n-1}$") for n number of layers. In certain embodiments, as shown in FIG. 10, single-head attention 1012 may be implemented for the final convolution layer ("Layer $l_n$"). Single-head attention 1012 may generate a final unified representation that is output to prediction determination module 204, shown in FIG. 2. In some embodiments, the final unified representation has fixed dimensions.

Figure 11:
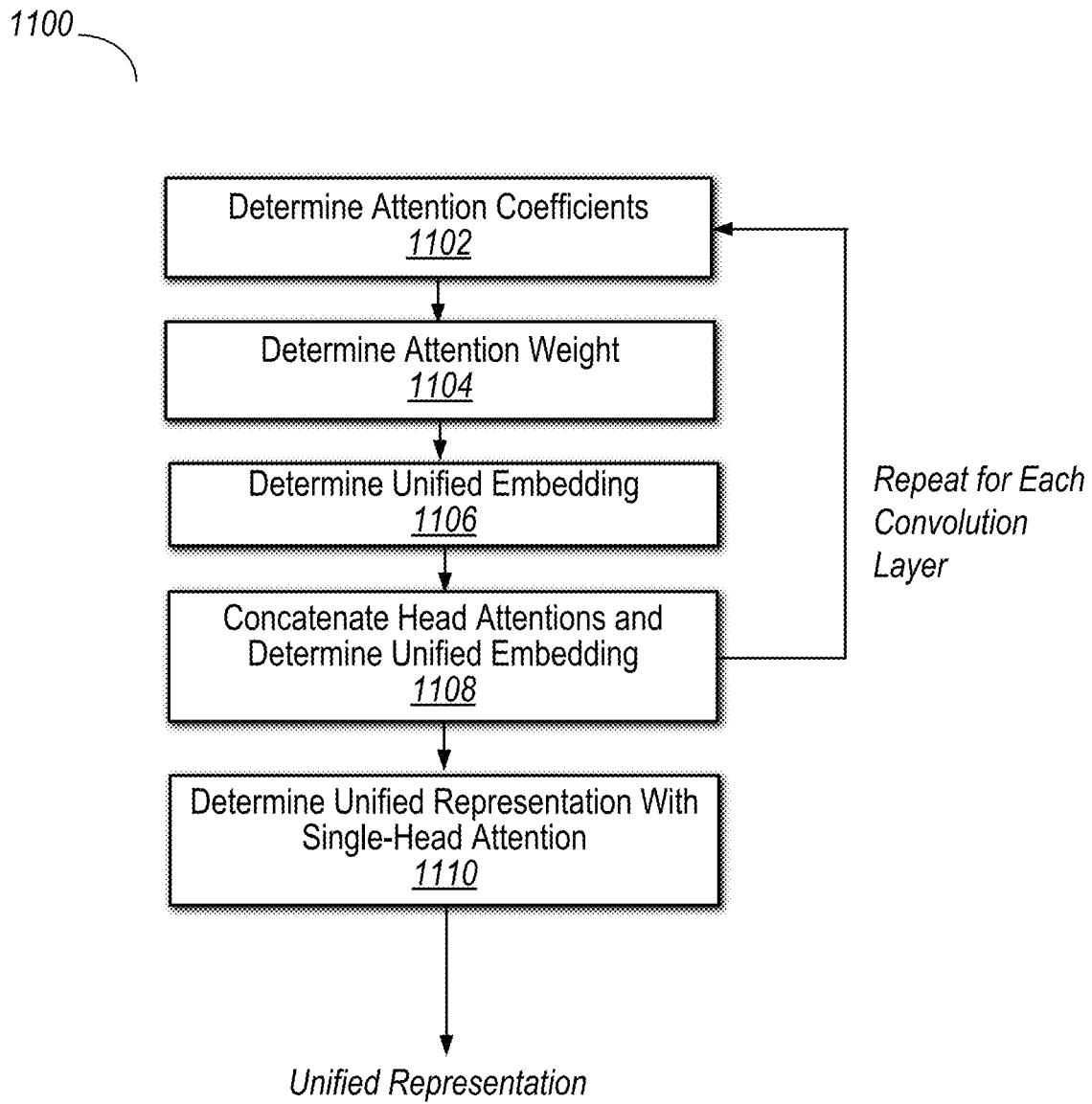
FIG. 11 depicts a flow diagram illustrating an embodiment of a multi-head attention network mechanism across multiple dual-path convolution layers, according to some embodiments.

FIG. 11 depicts a flow diagram illustrating an embodiment of a multi-head attention network mechanism across multiple dual-path convolution layers, according to some embodiments. Multi-head attention network mechanism 1100 may be implemented by unified embedding determination module 202, shown in FIG. 2. Multi-head attention network mechanism 1100 may enhance correlation between node connectivity and node topology structure similarities in each successive layer of the dual-path convolution. In some embodiments, multi-head attention network mechanism 1100 adjusts the importance between node connectivity and node topology structure similarities in each successive layer of the dual-path convolution.

In 1102, attention coefficients for node connectivity, represented by c, and node topology, represented by t, may be determined. The attention coefficients may be determined by:

$$e_{ij}^{l+1} = \text{LeakyReLU}(\alpha[Wh_i^l \| Wf_{ij}^{l+1}]), j \in \{c,t\}. \quad \text{Equation 6:}$$

In Equation 6, l denotes the l-th convolution layer, $h_i$ is the unified embedding, and $f_{ij}$ is either the output from connectivity determination module 106 or topology structure determination module 108 (e.g., j∈{c, t}). α is the weights of the transformation network while LeakyReLU is the nonlinearity function and ∥ denotes concatenation. A shared linear transformation W may be applied to the input features $h_i$ and $f_{ij}$ to enhance expressive power. In 1104, the attention weight may be determined. As $e_{ij}^{l+1}$ indicates the importance of the information to node i, the attention weight may be calculated with a SoftMax function:

$$a_{ij}^{l+1} = \text{SoftMax}_{ij}(e_{ij}^{l+1}) = \frac{\exp(e_{ij}^{l+1})}{\sum_{k \in c,t} \exp(e_{ik}^{l+1})}. \quad \text{Equation 7}$$

In 1106, the unified embedding may be obtained following implementation of Equation 7. The unified embedding may be obtained by:

$$h_i^{l+1} = \sigma(\Sigma_{j \in \{c,t\}} a_{ij}^{l+1} W f_{ij}^{l+1})$$

Equation 8:

From Equation 8, we may further adapt the multi-head attention mechanism to jointly extract different types of information from multiple representation subspaces. In 1108, the head attentions, K, are concatenated and the unified embedding is determined as:

$$h_i^{l+1} = \|_{k=1}^{K} \sigma(\Sigma_{j \in \{c,t\}} a_{ij}^{l+1,k} W f_{ij}^{l+1,k})$$

Equation 9:

Different convolution layers may contain different hops of neighborhood information for the nodes. Thus, each layer of the dual-path convolution may employ 1102-1108 in multi-head attention network mechanism 1100 before a single-head attention is applied in 1110 to determine a unified representation (also shown in FIG. 10).

Turning back to FIG. 2, the unified representation determined by unified embedding determination module 202 may be provided to prediction determination module 204. Prediction determination module 204 may determine one or more predictions based on the unified representation for the network dataset. In certain embodiments, prediction determination module 204 implements a classification network to determine the predictions. For example, prediction determination module 204 may implement a machine learning algorithm for classification.

A prediction layer for prediction determination module 204 may be computed by:

$$h'_i = Elu(h_i); \hat{y}_i = \text{LogSoftMax}(h'_i);$$

Equation 10:

where $h'_i$ is an activation function of the unified embedding $h_i$ for convergence and $\hat{y}_i$ is the output of the classification network.

In some embodiments, an additional normalization layer on top of the unified embedding may be added. With normalization, the prediction layer may be expressed by:

$$h'_i = h'_i / \|h'_i\|_2; \hat{y}_i = \log\left(\frac{\exp(h'_i)'}{\Sigma \exp(h'_{i_i})}\right).$$

Equation 11

The output $\hat{y}_i$ of prediction determination module 204 may be a prediction related to the network dataset. For example, for a prediction related to risk assessment, the output of prediction determination module 204 may be a 0 (high risk/risky) or a 1 (low risk/not risky) of an entity such as a seller.

In some embodiments, prediction determination module 204 (e.g., the classification network) is trained. For example, the classification network may be trained by using standard multi-class negative log-likelihood loss in tandem with log-SoftMax in Equation 11. The negative log-likelihood loss may be expressed by:

$$L = -\Sigma[y_i \log \hat{y}_i + (1-y_i)\log(1-\hat{y}_i)];$$

Equation 12:

where $y_i$ is the ground-truth label and $\hat{y}_i$ is the output of the classification network.

In various embodiments, as described herein, computing device 102 implements both connectivity determination module 106 and topology structure determination module 108 in a dual-path convolution along with prediction module 110 to learn connectivity and local topology structure for graph of a network dataset. Computing device 102 may determine one or more predictions for the network dataset in an end-to-end procedure of the dual-path convolution starting with the graph. In certain embodiments, both connectivity determination module 106 and topology structure determination module 108 receive, as input, unified embedding from a previous layer of unified embedding determination module 202 in prediction module 110. Additionally, the unified embedding from the previous layer may be applied in the next layer of unified embedding determination module 202. Implementing the previous layer of unified embedding in a successive layer of the dual-path convolution may allow connectivity determination module 106 and topology structure determination module 108 to mutually reinforce each other towards an aligned unified representation and, eventually, more effectively determine an accurate prediction for the network dataset.

Example Methods

Figure 12:
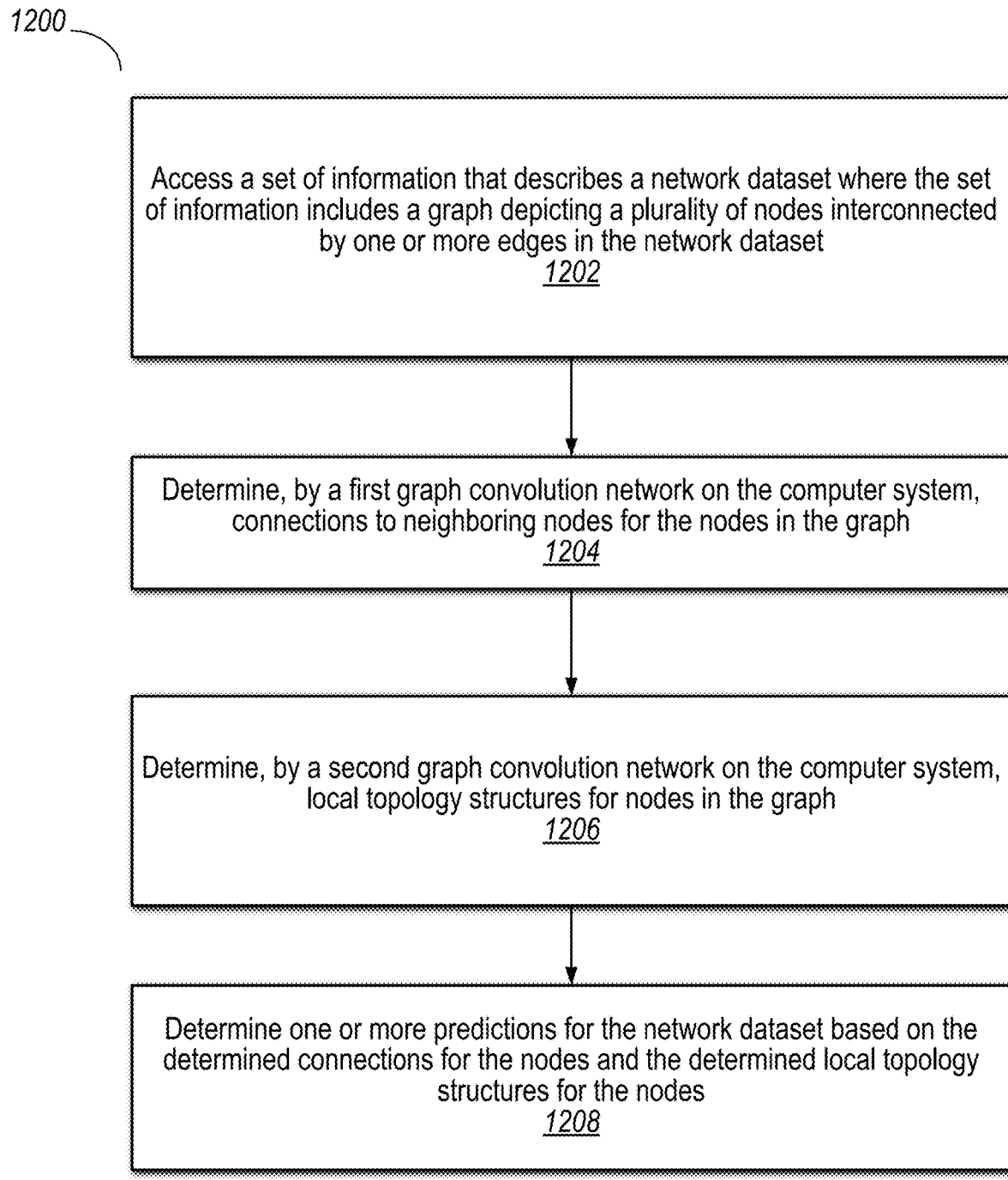
FIG. 12 is a flow diagram illustrating a method for determining one or more predictions for a network dataset, according to some embodiments.

FIG. 12 is a flow diagram illustrating a method for determining one or more predictions for a network dataset, according to some embodiments. Method 1200 shown in FIG. 12 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1510, described below.

At 1202, in the illustrated embodiment, a computer system accesses a set of information that describes a network dataset where the set of information includes a graph depicting a plurality of nodes interconnected by one or more edges in the network dataset. In some embodiments, the nodes represent entities and the edges represent transactions between the entities in the graph.

At 1204, in the illustrated embodiment, the computer system determines, by a first graph convolution network on the computer system, connections to neighboring nodes for the nodes in the graph.

At 1206, in the illustrated embodiment, the computer system determines, by a second graph convolution network on the computer system, local topology structures for nodes in the graph. In some embodiments, the local topology structures for the nodes in the graph are determined based on an arrangement of the nodes and the edges in the graph. In some embodiments, the computer system determines topology role nodes that correspond to topology structure features of the nodes in the graph, determines belongingness edges that connect the nodes in the graph to the topology role nodes that correspond to the topology structure features of the nodes, and determines the local topology structures for the nodes in the graph based on the determined topology role nodes and the determined belongingness edges. In some embodiments, determining the local topology structures for the nodes in the graph includes propagating information from the nodes to the topology role nodes and back-propagating information from the topology role nodes to the nodes.

At 1208, in the illustrated embodiment, the computer system determines one or more predictions for the network dataset based on the determined connections for the nodes and the determined local topology structures for the nodes. In some embodiments, the one or more predictions are determined by classification of the unified embeddings determined for the network dataset. In some embodiments, the computer system determines one or more unified embeddings for the network dataset based on the connections of the nodes and the local topology structures for the nodes.

In some embodiments, the first graph convolution network and the second graph convolution network are multi-layer graph convolution networks with a predetermined number of layers where the computer system: determines, for a first layer of the first graph convolution network and the second graph convolution network, a first layer unified embedding for the network dataset based on the connections of the nodes and the local topology structures for the nodes; and inputs the first layer unified embedding into a second layer of the first graph convolution network and the second graph convolution network.

FIG. 13 is a flow diagram illustrating a method for determining a unified representation for a network dataset, according to some embodiments. Method 1300 shown in FIG. 13 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1510, described below.

At 1302, in the illustrated embodiment, a computer system accesses a set of information that describes a network dataset where the set of information includes a graph depicting a plurality of nodes interconnected by one or more edges in the network dataset.

At 1304, in the illustrated embodiment, the computer system determines, by a first graph convolution network on the computer system, connections to neighboring nodes for the nodes in the graph.

At 1306, in the illustrated embodiment, the computer system determines, by a second graph convolution network on the computer system, local topology structures for nodes in the graph.

At 1308, in the illustrated embodiment, the computer system determines a unified representation of the network dataset based on the determined connections for the nodes and the determined local topology structures for the nodes where the unified representation of the network dataset has a lower dimension than the network dataset. In some embodiments, the unified representation of the network dataset includes a unified embedding vector representation of the network dataset. In some embodiments, the unified representation of the network dataset preserves a graph structure of the network dataset, the graph structure including paths of the nodes and the edges.

In some embodiments, the computer system classifies the unified representation of the network dataset to determine one or more predictions for the network dataset. In some embodiments, the nodes represent entities and the edges represent transactions between the entities in the graph where the one or more predictions include predictions for additional transactions between one or more of the entities.

In some embodiments, the first graph convolution network and the second graph convolution network are multi-layer graph convolution networks with a predetermined number of layers where the computer system: determines, for a first layer of the first graph convolution network and the second graph convolution network, a first layer unified representation for the network dataset based on the connections of the nodes and the local topology structures for the nodes; inputs the first layer unified representation into a second layer of the first graph convolution network and the second graph convolution network; and determines, for the second layer of the first graph convolution network and the second graph convolution network, a second layer unified representation for the network dataset based on the first layer unified representation in combination with the connections of the nodes and the local topology structures for the nodes.

In some embodiments, the computer system repeats, for each layer in the first graph convolution network and the second graph convolution network: inputting the unified representation of the previous layer into each layer of the first graph convolution network and the second graph convolution network; determining, for each layer of the first graph convolution network and the second graph convolution network, a unified representation for each layer in the network dataset based on the previous layer's unified representation in combination with the connections of the nodes and the local topology structures for the nodes; and for a final layer in the first graph convolution network and the second graph convolution network, inputting the previous layer's unified representation into the final layer of the first graph convolution network and the second graph convolution network to determine a final unified representation of the network dataset.

Figure 14:
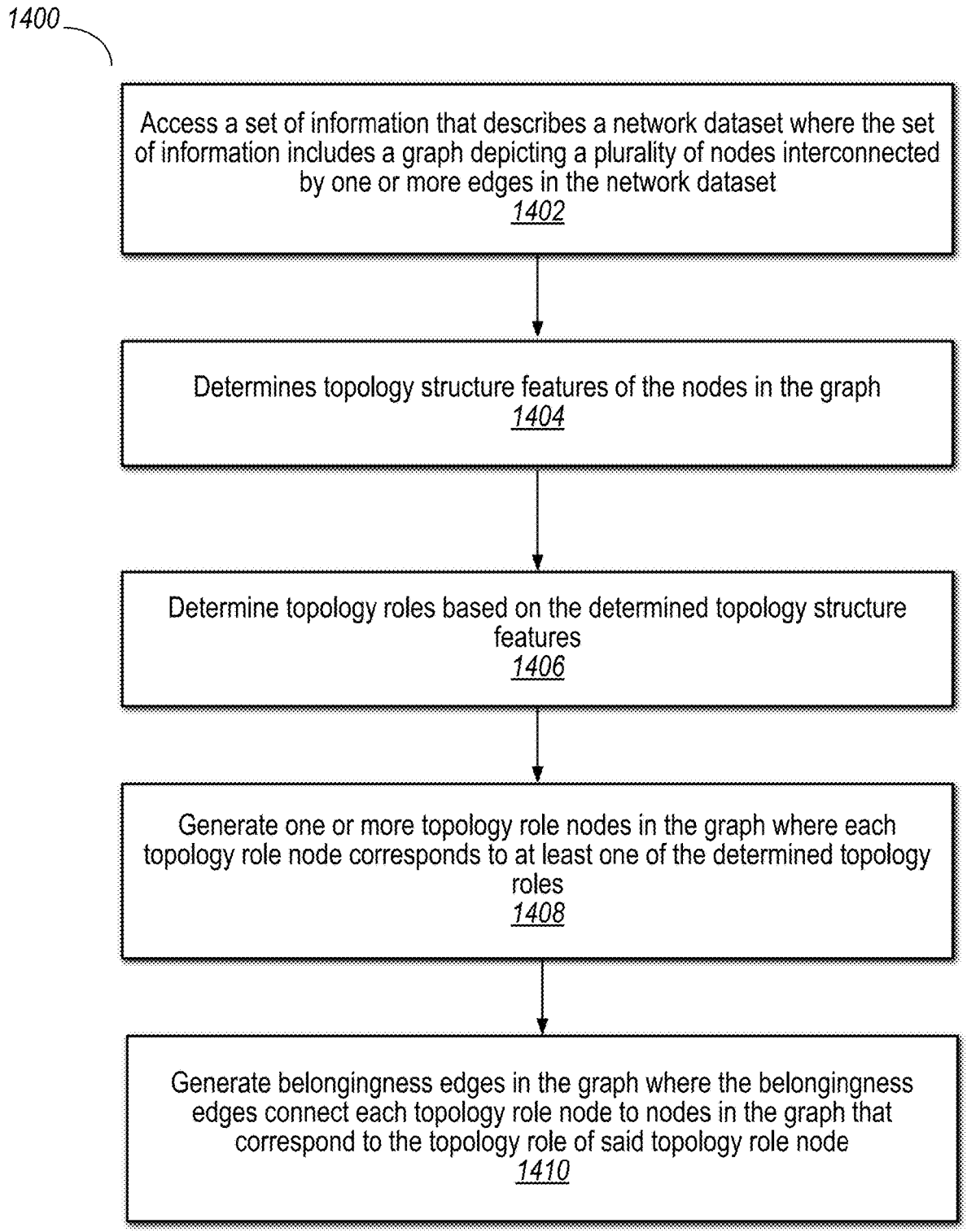
FIG. 14 is a flow diagram illustrating a method for determining topology role constructions, according to some embodiments.

FIG. 14 is a flow diagram illustrating a method for determining topology role constructions, according to some embodiments. Method 1400 shown in FIG. 14 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1510, described below.

At 1402, in the illustrated embodiment, a computer system accesses a set of information that describes a network dataset where the set of information includes a graph depicting a plurality of nodes interconnected by one or more edges in the network dataset.

At 1404, in the illustrated embodiment, the computer system determines topology structure features of the nodes in the graph.

At 1406, in the illustrated embodiment, the computer system determines topology roles based on the determined topology structure features. In some embodiments, determining the topology roles includes classification of the determined topology structure features. In some embodiments, determining the topology roles includes clustering of the determined topology structure features.

At 1408, in the illustrated embodiment, the computer system generates one or more topology role nodes in the graph where each topology role node corresponds to at least one of the determined topology roles.

At 1410, in the illustrated embodiment, the computer system generates belongingness edges in the graph where the belongingness edges connect each topology role node to nodes in the graph that correspond to the topology role of said topology role node. In some embodiments, the computer system determines, by a graph convolution network, local topology structures for the nodes in the graph based on the generated topology role nodes and the generated belongingness edges.

Example Computer System

Figure 15:
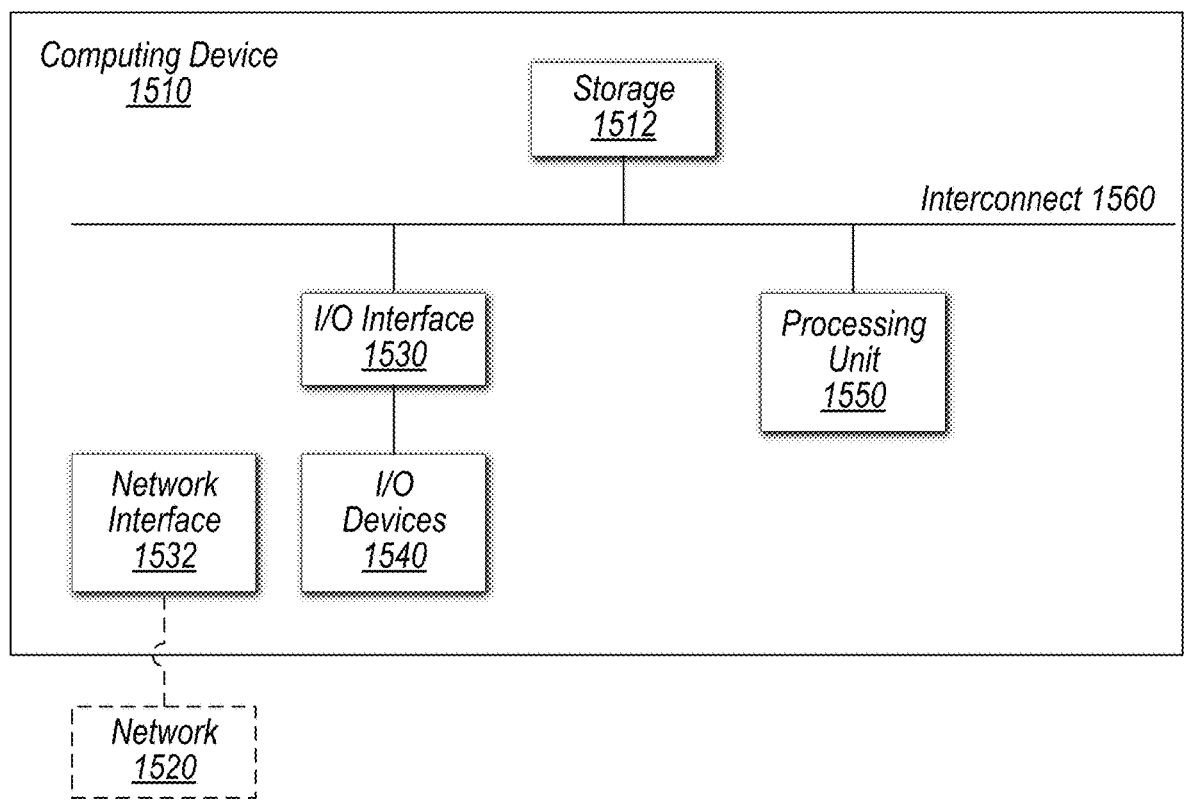
FIG. 15 is a block diagram of one embodiment of a computer system.

Turning now to FIG. 15, a block diagram of one embodiment of computing device (which may also be referred to as a computing system) 1510 is depicted. Computing device 1510 may be used to implement various portions of this disclosure. Computing device 1510 may be any suitable type of device, including, but not limited to, a personal computer system, desktop computer, laptop or notebook computer, mainframe computer system, web server, workstation, or network computer. As shown, computing device 1510 includes processing unit 1550, storage 1512, and input/output (I/O) interface 1530 coupled via an interconnect 1560 (e.g., a system bus). I/O interface 1530 may be coupled to one or more I/O devices 1540. Computing device 1510 further includes network interface 1532, which may be coupled to network 1520 for communications with, for example, other computing devices.

In various embodiments, processing unit 1550 includes one or more processors. In some embodiments, processing unit 1550 includes one or more coprocessor units. In some embodiments, multiple instances of processing unit 1550 may be coupled to interconnect 1560. Processing unit 1550 (or each processor within 1550) may contain a cache or other form of on-board memory. In some embodiments, processing unit 1550 may be implemented as a general-purpose processing unit, and in other embodiments it may be implemented as a special purpose processing unit (e.g., an ASIC). In general, computing device 1510 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 1512 is usable by processing unit 1550 (e.g., to store instructions executable by and data used by processing unit 1550). Storage 1512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 1512 may consist solely of volatile memory, in one embodiment. Storage 1512 may store program instructions executable by computing device 1510 using processing unit 1550, including program instructions executable to cause computing device 1510 to implement the various techniques disclosed herein.

I/O interface 1530 may represent one or more interfaces and may be any of various types of interfaces configured to couple to and communicate with other devices, according to various embodiments. In one embodiment, I/O interface 1530 is a bridge chip from a front-side to one or more back-side buses. I/O interface 1530 may be coupled to one or more I/O devices 1540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer system, comprising:
    a computer processor circuit; and
    a computer-memory storing instructions executable by the computer processor circuit to cause the computer system to perform operations including:
        accessing, at the computer system, a set of information that describes a network dataset, wherein the set of information includes a graph depicting a plurality of nodes interconnected by one or more edges in the network dataset;
        determining, by a first graph convolution network on the computer system, node connectivity for the nodes in the graph, wherein determining the node connectivity for a specific node includes determining identities of nodes connected to the specific node by the edges in the graph;
        determining, by a second graph convolution network on the computer system, local topology structures for the nodes in the graph, wherein determining the local topology structure for the specific node in the graph includes determining a number of edges connected to the specific node in the graph and a geometric arrangement of the connected edges with respect to the specific node; and determining, by the computer system, one or more predictions for the network dataset based on the determined connections for the nodes and the determined local topology structures for the nodes.

2. The computer system of claim 1, wherein the operations further include:
determining, by the computer system, one or more unified embeddings for the network dataset based on the node connectivity and the local topology structures for the nodes.

3. The computer system of claim 1, wherein the one or more predictions are determined based on similarities in the determined local topology structures for the nodes, wherein two nodes have similar local topology structures when the two nodes have a similar number of edges connected to the nodes and a similar geometric arrangement of the connected edges.

4. The computer system of claim 1, wherein the first graph convolution network and the second graph convolution network are multi-layer graph convolution networks with a predetermined number of layers, and wherein the operations further include:
determining, for a first layer of the first graph convolution network and the second graph convolution network, a first layer unified embedding for the network dataset based on the connections of the nodes and the local topology structures for the nodes; and
inputting the first layer unified embedding into a second layer of the first graph convolution network and the second graph convolution network.

5. The computer system of claim 1, wherein determining the local topology structures for the nodes in the graph includes:
generating topology role nodes on the graph, wherein the topology role nodes correspond to topology structures of individual nodes in the graph, wherein each node has a corresponding topology role node, and wherein each topology role node corresponds to at least one node in the graph;
generating belongingness edges on the graph, wherein the belongingness edges connect the nodes in the graph to their corresponding topology role nodes, wherein each node in the graph has its own belongingness edge connecting the node to its corresponding topology role node; and
determining, from the graph, the local topology structures for the nodes in the graph based, at least in part, on the topology role nodes and the belongingness edges generated on the graph.

6. The computer system of claim 5, wherein the determining the local topology structures for the nodes in the graph includes:
propagating information from the nodes to the topology role nodes through the belongingness edges; and
back-propagating information from the topology role nodes to the nodes through the belongingness edges.

7. The computer system of claim 5, wherein the one or more predictions are determined based on similarities in the determined local topology structures for the nodes, and wherein two nodes have similar local topology structures when the two nodes are connected to the same topology role node by their own respective belongingness edges.

8. The computer system of claim 1, wherein the nodes represent entities and the edges represent transactions between the entities in the graph.

9. The computer system of claim 1, wherein the node connectivity for the specific node includes determining the identities of neighboring nodes that are directly connected to the specific node by the edges in the graph and the identities of subsequent nodes that are connected to the neighboring nodes by additional edges in the graph.

10. A method, comprising:
accessing, at a computer system, a set of information that describes a network dataset, wherein the set of information includes a graph depicting a plurality of nodes interconnected by one or more edges in the network dataset;
determining, by a first graph convolution network on the computer system, node connectivity for the nodes in the graph, wherein determining the node connectivity for a specific node includes determining identities of nodes connected to the specific node by the edges in the graph;
determining, by a second graph convolution network on the computer system, local topology structures for the nodes in the graph, wherein determining the local topology structure for the specific node in the graph includes determining a number of edges connected to the specific node in the graph and a structural arrangement of the connected edges with respect to the specific node; and
determining, by the computer system, a unified representation of the network dataset based on the determined connections for the nodes and the determined local topology structures for the nodes, wherein the unified representation of the network dataset has a lower dimension than the network dataset.

11. The method of claim 10, wherein the unified representation of the network dataset includes a unified embedding vector representation of the network dataset.

12. The method of claim 10, wherein the unified representation of the network dataset preserves a graph structure of the network dataset, the graph structure including paths of the nodes and the edges.

13. The method of claim 10, further comprising classifying, by the computer system, the unified representation of the network dataset to determine one or more predictions for the network dataset.

14. The method of claim 13, wherein the nodes represent entities and the edges represent transactions between the entities in the graph, and wherein the one or more predictions include predictions for additional transactions between one or more of the entities.

15. The method of claim 10, wherein the first graph convolution network and the second graph convolution network are multi-layer graph convolution networks with a predetermined number of layers, and wherein the method further comprises:
determining, for a first layer of the first graph convolution network and the second graph convolution network, a first layer unified representation for the network dataset based on the connections of the nodes and the local topology structures for the nodes;
inputting the first layer unified representation into a second layer of the first graph convolution network and the second graph convolution network; and
determining, for the second layer of the first graph convolution network and the second graph convolution network, a second layer unified representation for the network dataset based on the first layer unified representation in combination with the connections of the nodes and the local topology structures for the nodes.

16. The method of claim 15, further comprising repeating, for each layer in the first graph convolution network and the second graph convolution network:
   inputting the unified representation of a previous layer into each layer of the first graph convolution network and the second graph convolution network;
   determining, for each layer of the first graph convolution network and the second graph convolution network, a unified representation for each layer in the network dataset based on the previous layer's unified representation in combination with the connections of the nodes and the local topology structures for the nodes; and
   for a final layer in the first graph convolution network and the second graph convolution network, inputting the previous layer's unified representation into the final layer of the first graph convolution network and the second graph convolution network to determine a final unified representation of the network dataset.

17. A non-transitory computer-readable medium having instructions stored thereon that are executable by a computing device to perform operations, comprising:
   accessing a set of information that describes a network dataset, wherein the set of information includes a graph depicting a plurality of nodes interconnected by one or more edges in the network dataset;
   determining topology structure features of the nodes in the graph;
   determining topology roles from the topology structure features determined for the nodes in the graph;
   generating topology role nodes on the graph that correspond to the topology roles, wherein each node is associated with one topology role node, and wherein each topology role node that is generated is associated with at least one node in the graph; and
   generating belongingness edges on the graph that connect the nodes in the graph to their corresponding topology role nodes, wherein each node in the graph has one belongingness edge connecting the node to its corresponding topology role node.

18. The non-transitory computer-readable medium of claim 17, wherein determining the topology roles includes classification of the determined topology structure features.

19. The non-transitory computer-readable medium of claim 17, wherein determining the topology roles includes clustering of the determined topology structure features.

20. The non-transitory computer-readable medium of claim 17, further comprising determining, by a graph convolution network, local topology structures for the nodes in the graph based, at least in part, on the generated topology role nodes and the generated belongingness edges.

* * * * *